Aug. 8, 1939.  J. MIHALYI  2,169,000
FILM WIND FOR FOLDING CAMERAS
Filed Dec. 15, 1937  2 Sheets-Sheet 2
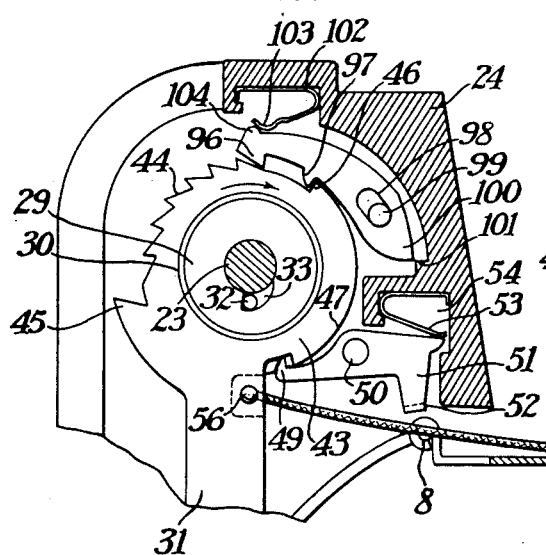
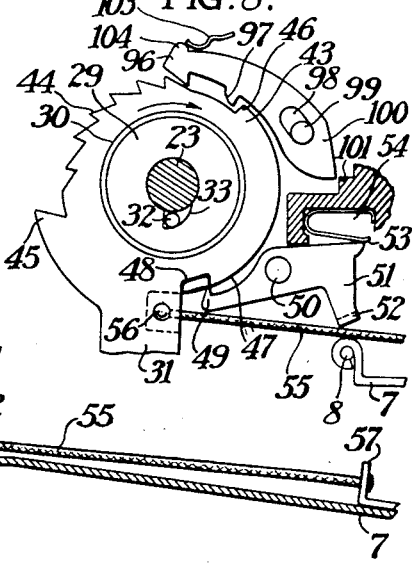
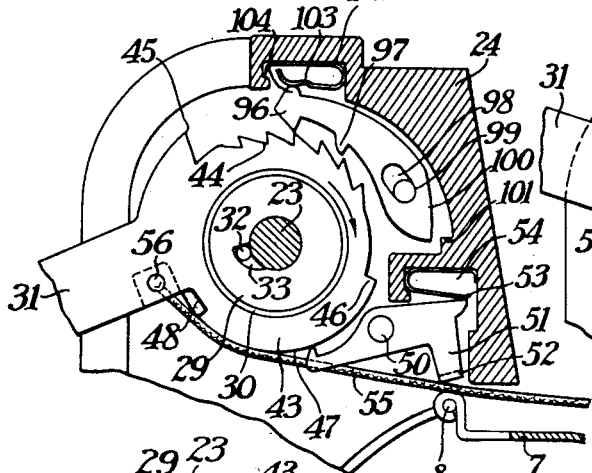
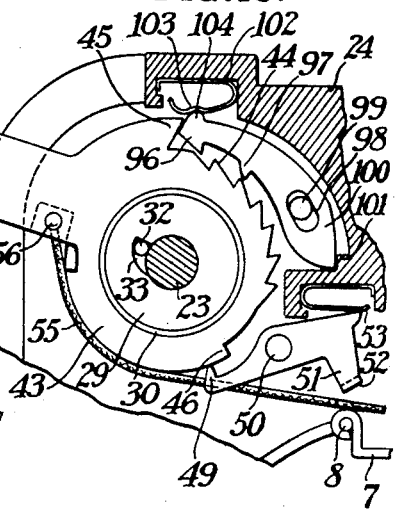
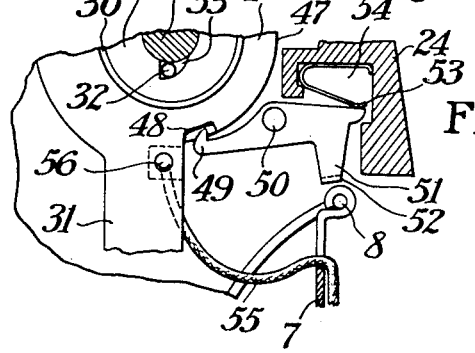
Joseph Mihalyi
INVENTOR.
BY
ATTORNEYS.

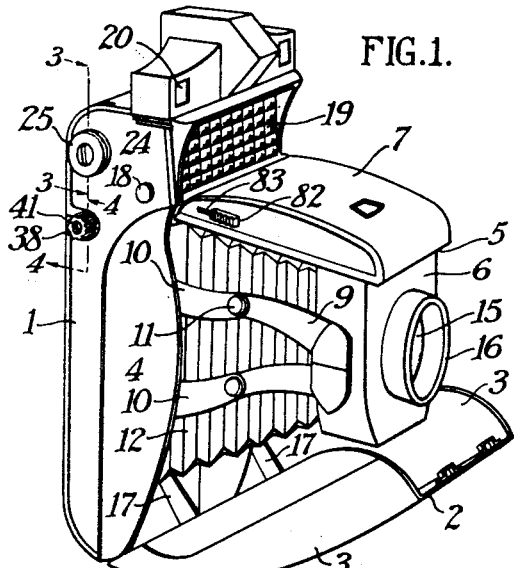

Patented Aug. 8, 1939

2,169,000

UNITED STATES PATENT OFFICE 2,169,000

FILM WIND FOR FOLDING CAMERAS

Joseph Mihalyi, Rochester, N. Y., assignor to Eastman Kodak Company, Rochester, N. Y., a corporation of New Jersey Application December 15, 1937, Serial No. 179,963

5 Claims. (Cl. 95—32)

This invention relates to photography and more particularly to a film winding device for folding cameras.

One object of my invention is to provide a folding camera with a film winding device so arranged that the film can only be wound when the camera is in an open or picture-taking position. Another object of my invention is to provide a camera in which film may be wound by a handle and to provide a means for latching the handle against movement when the camera is in a folded position. Another object of my invention is to provide a camera having a member hinged thereto carrying a portion of a camera shutter of the type requiring setting before use and to provide a flexible connection between the shutter setting member and the film winding handle, which flexible connection may release the handle holding latch when the camera is in an open or picture-taking position. Still another object of my invention is to provide a film winding handle with a latch permitting lost motion of the handle, this lost motion being sufficient to release the latch member when the camera parts are in an unfolded position, and other objects will appear from the following specification, the novel features being particularly pointed out in the claims at the end thereof.

Coming now to the drawings wherein like reference characters denote like parts throughout:

Fig. 1 is a perspective view of a camera constructed in accordance with and embodying my invention;

Fig. 2 is a fragmentary perspective view of some of the shutter parts which are shown in the drawings in a partially separated position, to best illustrate the working elements carried by these parts;

Fig. 3 is a fragmentary detail section through the winding key post and its support, taken on line 3—3 of Fig. 1;

Fig. 4 is a fragmentary section on line 4—4 of Fig. 1;

Fig. 5 is a fragmentary side elevation partially in section of the winding arm latch;

Fig. 6 is a detail plan view of the shutter leaf driving mechanism;

Fig. 7 is a fragmentary side elevation partially in section showing the film winding structure and its connection the shutter;

Figs. 8, 9 and 10 are fragmentary views similar to Fig. 7, but with parts shown in a series of difficult positions to illustrate the functions of the various elements.

Fig. 11 is a fragmentary detail view showing the position of the parts relative to the latch when the camera parts are in a folded position.

In most folding cameras, and particularly in compact folding cameras, film is frequently damaged by being wound from one exposure to another when the camera is in a folded position. When in a folded position, it sometimes occurs that portions of the bellows particularly after the fold becomes worn, or a portion of the rear lens mount of the photographic objective may project close to or in the plane of a film lying across the exposure aperture, so that it is possible to scratch film by winding it when the camera is folded. With the modern cameras employing exceedingly large aperture lenses, this difficulty is more liable to occur than where the objectives are of smaller aperture and do not require such large lens cells.

I have therefore found it desirable, for these and other reasons, to prevent film from being wound unless the camera is unfolded into a picture-taking position so that there is no possibility of any parts of the folded camera projecting into the path of the film being moved.

In accordance with my present invention, a camera mechanism is so arranged that the handle used to wind the film is locked against movement at all times except when the camera is fully opened into an operative or picture-taking position, at which time slight movement of the handle releases the latching mechanism so that the film may be wound and the shutter may be set in a single operation.

In my Patent No. 2,132,695 granted October 11, 1938, for "Roll holding camera", certain features of the winding mechanism are claimed, and for convenience in illustrating a preferred embodiment of my invention, the present application shows the same camera as shown in the patent above referred to.

Certain other features of the film winding mechanism are shown in my Patent No. 2,090,060, for "Double exposure prevention camera", granted August 17, 1937.

In the embodiment illustrated, the camera may consist of a body portion 1 to which a bed 2 is hinged, the bed having side flanges 3 adapted to telescope the recess portions 4 of the side of the camera when the camera is folded. This camera preferably carries a shutter which is made in two parts and which is designated broadly as 5. This shutter is fully described and claimed in my Patent No. 2,117,971, granted May 17, 1938, and only such parts of the shutter as are necessary for a complete understanding of this invention are shown in connection with this application.

The shutter is contained in two casings, one part, 6, forming the camera front, and the other part, 7, being hinged to the camera body on a pintle 8.

The camera front 6 is preferably supported by similar pairs of lazy tongs 9 and 10 pivotally connected at 11, the pivotal points of which separate in a well known manner as the front 6 is moved parallel to the camera body into a folded position. A bellows 12 connects the usual exposure frame and the camera front 6.

Referring to Fig. 2, the camera front 6 is provided with a pair of shafts 13 which are shown removed from, but which nevertheless slide in the overturned flanges 14. Thus, during the opening movement of the camera, the pins 13 slide in the tracks 14 and the casing 7 swings about its hinge 8 as the camera front 6 is moved to an operative position.

The camera front 6 may be provided with an objective 15 and in the form shown, focusing is accomplished by turning the front lens cell 16 in a manner well known in the art.

The camera bed 2 may be supported in its open position by bed braces 17 which may be released by pressing the push button 18 on the side wall of the camera.

While not important for the present invention, the camera is preferably equipped with a light-sensitive meter 19 for measuring the light and for automatically adjusting parts of the camera mechanism, and may be equipped with a range finder 20. As thus far described, the parts are not essential to my present invention.

As indicated in section in Fig. 3, the camera body 1 is provided with a spool chamber 21 in which a winding key flange 22 of the usual type is employed to engage the slot in a film spool. This flange is carried by a shaft 23 passing entirely through the side wall 24 of the camera and terminating in a knob 25. The support for the shaft 23 in the side wall of the camera consists of a one-way clutch 26 of a known type in which a roller 27 lies in an arcuate race, so that it will bind and prevent the shaft from turning in one direction, and so that it will run freely and permit the shaft to turn in an opposite direction. This clutch member is held in place by a casing 28. The clutch is similar to the clutch shown in Fig. 7, wherein the key shaft 23 passes through the clutch 29 carried by a casing 30 on the winding arm 31. This clutch, like the one above described, consists of a roller 32 movable in an arcuate race 33, so as to bind and cause the shaft to turn in the direction shown by the arrow when the winding arm 31 is moved in a clockwise direction with regard to Fig. 7, this roller releasing the shaft when the arm is turned in an opposite direction.

The arm 31, which is an oscillatable part which can be moved back and forth to wind film, moves between two limits of movement, the upper limit is defined by stops which will be later described, and the lower limit, or the normal position of rest, being determined by the latch seat 34. Referring to Figs. 5 and 6, it will be seen that the side wall 24 of the camera is provided with an opening having a narrow neck 35 and an enlarged area 36 adapted to receive the annular shank 37 of the winding handle 38. The winding handle is held to the arm 31 by means of a post 39 surrounded by a coiled spring 40 which bears against the head of the post 41 and a shoulder 42 in the handle. Thus, by drawing out upon the handle 38, the spring is compressed and the cylindrical portion 37 can be drawn out of the annular recess 36 so that the handle 31 may be turned to wind film.

However, it is desirable to lock the film winding mechanism against movement until an exposure has been made. To accomplish this, the following mechanism is employed: Referring to Fig. 7, it will be seen that the winding arm 31 is provided with an enlarged head 43, a part of which 44 has been provided with ratchet teeth, a lug 45, a shoulder 46, an arcuate surface 47 and a notch 48.

The notch 48 is designed to latch the handle 31 against movement until the shutter parts are in a predetermined position. This is accomplished in the following manner: The notch 48 is adapted to receive a hook 49 of a latch member pivoted at 50 and having an arm 51 with an inwardly turned flange 52. A spring 53, in a recess 54, tends to press the latch into the latching position shown in Fig. 7.

However, the latch can be moved from this position by means of a flexible connection 55 attached to the winding arm at 56 and attached to a slide 57 which forms a part of the shutter. When the flexible connection 55, which may be in the form of a cable or chain, is drawn taut, as indicated in Fig. 8, it presses upon the overturned end 52 of the pivoted latch member and swings the hook 49 from its operative engagement with the notch 48.

Thus, the arm 31 is released, and by pulling out the handle 38 and moving the arm 31, film can be wound, subject to other conditions which will be later described. As indicated in Fig. 8, during the winding movement the latch member 49 rides idly over the arcuate surface 47, but when the winding has been completed and the handle 40 returned to its normal position of rest, the latch member 49 will be in position to engage the notch 48.

A few of the shutter parts necessary to understand this invention will be described next. However, the complete shutter is fully shown and described in my copending application above referred to.

In the shutter front 6 I prefer to mount the diaphragm which is here shown as consisting of leaves 58, many of which have been omitted for the sake of clearness, which can be opened and closed by turning the diaphragm ring 59, this ring being attached to an arm 60 pivoted at 61 so that this arm can move and can be controlled by the light intensity measured by the light sensitive element lying behind the lenses. Light falling on the light sensitive element after passing through the lenses 19 actuates the meter 62, so that the arm 63 swings freely, and just before an exposure is made the comb-like member 64, which passes through the slotted guide post 65, engages the arm, and by swinging the lever 60 until it engages the meter arm 63, the diaphragm is automatically set in accordance with the prevailing light conditions. This structure is more fully described in my Patent No. 2,124,886 granted July 26, 1938.

The shutter leaves which lie behind the diaphragm leaves 58 may be actuated in a known manner by the post 66 which is held against movement by a spring latch 67 until the shutter front slides to its outermost position as the pins 13 move through the guideways 14. At its outer position a lug 68 on the member 7 engages the upstanding end 69 of the spring latch and swings it to the position shown in dotted lines, in which the post 66 is released. However, by this time the post 66 has become engaged by the notch 70 of the driving arm 71 which is attached to the driving member 72, this member being driven through a gear 73 from a shutter setting member 74.

The driving member 72 is driven through somewhat more than 90°, moving the arm 71 rapidly back and forth to open and close the shutter blades in a known manner. During the setting movement, as illustrated in Fig. 6, the hook-like member 70 rides past the post 66 idly, and consequently does not open and close the shutter while the shutter is being set.

In order to set the shutter, the setting member 74 is provided with a post 75 which lies in the path of a lug 76 on the slide 57, which is connected to the winding arm 31 by the flexible connection 55. Consequently, when the winding arm 31 is moved to wind the film lug 76, through engagement with pin 75, turns the ring 74 until the lug 77 engages the latch 78 which is pivoted to 7 on the end of a trigger member 79 by a stud 80 and having a fork 81 adapted to be engaged by the shutter trigger release member 82. Thus, when the shutter trigger is moved in its slot 83 (Fig. 1) toward the camera body, the trigger 78 releases the lug 77, and the ring 74 will rapidly turn under the impulse of spring 84. This, through the driving member 72 and arm 71, will open and close the shutter.

There is no need to describe in detail the timing mechanism by which various different times of exposures can be produced because this is the subject of my copending application Serial No. 106,552 above referred to.

From Fig. 6 it should be noted that the driving member 72 has a groove 85 extending around its central pivot 86. The reason for this groove is that the arm 87, which is pivoted at 88 to member 7, is provided with a downwardly extending lug 89 which extends into the groove 85. Since arm 87 is connected by the member 90 to the trigger 79, being attached thereto by means of the lug 91, the trigger cannot move unless the arm 87 moves.

Consequently, if an effort is made to move the trigger 82, and the lug 89 lies in the groove 85, the trigger will not release the shutter. The reason for this is as follows: If the film has not been fully wound, and consequently, if the handle 38 should not be in its normal position of rest, in which it engages the spring latch 36—37, the slide 57 will not have returned to its lowermost position. Consequently, the cam surface 92 will not have raised the end 93 of the lever 87 and removed lug 89 from the groove 85. Therefore, it is necessary to return the winding lever to its position of rest before an exposure can be made.

It should be noted that the slide 57 is normally moved toward the shutter front by means of a spring 94, but the action of this spring is not sufficiently strong to release the latch 48—49, and this can only be done by the pin 75 of the shutter setting member coming to its normal position of rest against the lug 76. Thus, when an exposure had been made and ring 74 moves under the impulse of spring 84, the pin 75 swings quickly around and sharply strikes the lug 76, drawing the flexible connection 55 taut and releasing the latch 48—49.

If it were only necessary to return the winding arm 31 to its initial position of rest before making an exposure, it would be possible to make an exposure without fully winding the film. With this type of winding mechanism, the arm must be oscillated back and forth a number of times before the film is wound. However, with the mechanism which will now be described, it is necessary to move the arm 31 one complete stroke before it can be returned to its initial position of rest. Consequently, if an operator starts to wind film, it is thought there is very little chance that the film would be left incompletely wound.

Again referring to Figs. 7 to 10, inclusive, the structure which prevents the arm from being returned to its normal position of rest until the first full stroke of the arm is made is as follows: The ratchet teeth 44 on the enlarged end 43 of the arm 31 are adapted to be engaged by a pawl member 96. This pawl member is provided with a downwardly extending lug 97, a slot 98, which turns on and slides about a pin 99, and a tail 100, which is adapted to either swing above or engage the inwardly extending projection 101. A spring 102 normally presses the pawl towards the ratchet teeth, and the spring is provided with a grooved end 103 which is adapted to retain the pawl in a set position upon its pivot 99, since a rounded projection 104 on the pawl is adapted to be engaged by the spring projection 103, which may rest on either side of the projection 104. Fig. 7 shows one position and Fig. 10 shows the other.

With the parts in the position shown in Fig. 7, as soon as the flexible cable 55 is drawn taut, and the arm 31 released, the arm may be swung in a clockwise direction while the pawl 96 snaps over the ratchet teeth 44.

Should the operator turn the arm 31 only to the position shown in Fig. 9, if he attempted to return the arm to its position of rest in a counter-clockwise direction, the pawl 96 would engage a ratchet tooth 44 and would prevent this return movement. Accordingly, the operator would again turn the arm 31 to its upper extent of movement indicated in Fig. 10, in which the shoulder 45 engages the end 96 of the pawl, moving it upon the pivot 99 until the tail 100 is engaged behind the shoulder 101. In this position the pawl member is held out just beyond the end of the ratchet teeth 44 so that the arm may be now turned in counter-clockwise direction without being obstructed by the pawl.

The operator may now make as many strokes as he desires, and these may be either full strokes or part strokes. As he oscillates the lever 31 he watches the film number appear in the usual red window in the camera back and stops the winding operation at any desired point, after which he swings the handle down to its normal position of rest, seating the latch members 36 and 37. Just before this seating operation occurs, flange 46 strikes lug 97 on the pawl and moves it upon the stud 99 back to the initial position shown in Fig. 7. In this position the latch 48—49 likewise becomes engaged.

It will thus be seen that it is necessary to make one full winding stroke with the handle 31 in order to release the pawl 96. Consequently, the film operation must actually be started before the arm 31 can be returned to its initial position of rest, and before it is in position to permit the flexible connection 55 to raise the latching arm 87 to move the lug 89 from the groove 85, and consequently permit the shutter trigger to be operated.

There is an additional reason for requiring arm 31 to make one full stroke in winding a film into place. Unless this arm is moved to its upper limit of movement, which is defined by the engagement of projection 45 with the end of the pawl 96, the flexible connection 55 will not cause the slide 57 to move far enough for the shutter setting member 77 to engage the trigger 78. Consequently, it is during this first full stroke of the winding lever that the shutter is set.

It should be noted that when the camera parts are in an unfolded or picture-taking position, as shown in Fig. 2, the latch member 49 lies in the path of the flexible member 55, which is, however, not sufficiently tensioned to operate the arm 51 of the latch and move it against the pressure of spring 53. However, when the handle 38 is moved the slight distance permitted by the notch 48 which forms one latch element which is engaged by the latch element 49, the flexible member 55 may be placed under tension, as clearly shown in Fig. 8, drawing the cable in a substantially straight line so that the latch member will swing about the pivot 50 against the pressure exerted by spring 53, so that the handle may be moved as much as is necessary for winding the film. It is, of course, first necessary to wind the handle one full stroke because otherwise it would be held against movement by the pawl 96 as described above.

However, when the camera parts are in the folded position and the cable lies loosely as indicated in Fig. 11, even if the handle 38 is moved the slight distance permitted by the lost motion connection between the latch elements 48 and 49, the cable cannot be tensioned sufficiently to release the latch 49. This is true because, as indicated in Figs. 2 and 11, the end of the cable lies beyond the end of the hinge pintle 8 and consequently, movement of the arm 31 when the camera parts are in a folded position cannot straighten out the cable 55 sufficiently to engage the latch arm 51.

While I have described a preferred embodiment of my invention, which is particularly adapted for use with the camera shown in the drawings, it is obvious that other embodiments can readily be made for other types of folding cameras. I consider as within the scope of my invention all such forms as may come within the scope of the appended claims.

What I claim is:

1. In a roll holding camera of the folding type, the combination with a camera body, a member hingedly attached thereto and adapted to move to and from an operative picture-taking position, a film winding key shaft, means for turning said shaft comprising an oscillatable handle carrying a latch element, a latch pivoted on the camera body and normally engaging said latch element to hold the oscillatable handle against movement, and means operably connected to the hinged member and to the handle and adapted to engage the pivoted latch for releasing said latch only when said camera parts are in a picture-taking position.

2. In a roll holding camera of the folding type, the combination with a camera body, of a member hingedly attached thereto and movable from a position adjacent the camera body in a folded position to a position projecting at an angle from the camera body in a picture-taking position, a film winding key shaft, a handle for turning the shaft, a latch element carried by said handle, a latch element carried by the camera body, and a latch releasing member affixed to the handle at one end and supported by the hinged member at the other and positioned adjacent the latch element when the hinged member is swung about its hinge and into a picture-taking position, whereby said latch may be operated when the parts are in a predetermined position.

3. In a roll holding camera of the folding type, the combination with a camera body, of a member hingedly attached thereto and movable from a position adjacent the camera body in a folded position to a position projecting at an angle from the camera body in a picture-taking position, a film winding key shaft, a handle for turning the shaft, a latch element carried by said handle, a latch element carried by the camera body, and a latch releasing member affixed to the handle at one end and supported by the hinged member at the other and comprising a flexible member adapted to fold with the hinged member about the hinge, the ends of the flexible member being so mounted that said flexible member may lie adjacent the latch when the hinged member is swung to a picture-taking position.

4. In a roll holding camera of the folding type, the combination with a camera body, of a member hingedly attached thereto and movable from a position adjacent the camera body in a folded position to a position projecting at an angle from the camera body in a picture-taking position, a film winding key shaft, a handle for turning the shaft, a latch element carried by said handle, a latch element carried by the camera body, and a latch releasing member affixed to the handle at one end and supported by the hinged member at the other and comprising a flexible cable, the position of the cable attached to the handle at one end and supported by the hinged member at the other end being such that the flexible cable as a whole lies above the hinge of the hinged element, whereby said cable may always lie in a slack condition spaced from the latch elements when the camera parts are in a folded position and said latch elements may hold the film winding handle against movement.

5. In a roll holdnig camera of the folding type, the combination with a camera body, of a member hingedly attached thereto and movable from a position adjacent the camera body in a folded position to a position projecting at an angle from the camera body in a picture-taking position, a film winding key shaft, a handle for turning the shaft, a latch element carried by said handle, a latch element carried by the camera body, and a latch releasing member comprising a flexible cable, one end of said cable being attached to the film winding handle, the other end of the cable being supported above the hinged camera member, the two supports for the ends of the cable being so located as to hold an intermediate portion of the cable adjacent a latch element when the camera parts are in a picture-taking position, said cable supports being brought together by folding the foldable member about its hinge to move the camera parts to a folded position in which the hinged member lies adjacent the camera body whereby the cable may be spaced from the latch members.

JOSEPH MIHALYI.